United States Patent [19]

Saegusa

[11] Patent Number: 5,406,347
[45] Date of Patent: Apr. 11, 1995

[54] CAMERA SYSTEM
[75] Inventor: Takashi Saegusa, Kawasaki, Japan
[73] Assignee: Nikon Corporation, Tokyo, Japan
[21] Appl. No.: 104,618
[22] Filed: Aug. 11, 1993
[30] Foreign Application Priority Data
  Aug. 19, 1992 [JP] Japan .................. 4-220265
[51] Int. Cl.6 .............................. G03B 17/00
[52] U.S. Cl. .................. 354/289.1; 354/486
[58] Field of Search .......... 354/195.1, 286, 288, 354/289.1, 486

[56] References Cited
U.S. PATENT DOCUMENTS 4,814,802 3/1989 Ogawa ..................... 354/286 X
5,128,704 7/1992 Hayashi et al. ................ 354/289.1

Primary Examiner—Howard B. Blankenship
Attorney, Agent, or Firm—Shapiro and Shapiro

[57] ABSTRACT

In a camera system consisting of a main camera body and an accessory mountable thereon, the camera body includes an output device for releasing a variable signal in response to an external operation, a main body communication device capable of communicating with the accessory, and an identification device for identifying the content of a signal transmitted from the accessory through the main body communication device; while the accessory includes an operation device for releasing an operation signal in response to an external operation, and an accessory communication device capable of communicating with the camera body, wherein, when the identification device identifies the operation signal released from the operation device, the transmission of the variable signal from the camera body to the accessory is permitted and the information setting in the accessory is executed according to the variable signal, but, when the identification device does not identify any operation signal, the information setting in the camera body is executed according to the variable signal.

29 Claims, 10 Drawing Sheets

CAMERA SYSTEM

BACKGROUND OF THE INVENTION

1. Field of the Invention

The present invention relates to an information setting device for a camera system on which accessories are mountable.

2. Related Background Art

With the increase in functions of a so-called system camera, the operation means for such functions become no longer accommodatable in the main body of the camera. For this reason, such operation means are often provided in the accessories mountable on the main body. Particularly recently, microcomputers are provided not only in the main body of the camera but also in the accessories therefor.

However, the operability of the operation means of the accessory has not been improved comparable to that in the main body. More specifically, in order to activate a function of the main body of the camera, the operation means of said main body has to be operated, and, in order to activate a function of the accessory, the operation means of said accessory has to be operated. In this manner there have been involved complicated operations.

SUMMARY OF THE INVENTION

An object of the present invention is, in a camera system including a main body of the camera and an accessory which is detachably mountable on said main body, to improve the operability by utilizing operation means for both the main body and the accessory.

The above-mentioned object can be attained, according to the present invention, by a camera system including a main body of the camera and an accessory which is detachably mountable on said main body, comprising:

- a main camera body including first operation means which is externally operable, variable means which is externally operable and releases a variable signal according to said external operation, communication means for communicating with said accessory, and identification means for identifying the content of communication from said accessory;
- an accessory including second operation means which is externally operable, and communication means for communicating with said main camera body; and
- information setting means for effecting information setting on said main camera body by said variable signal when said first operation means is operated, and transmitting said variable signal from said main camera body to said accessory when said identification means identifies that said second operation means is being operated, thereby effecting information setting of said accessory by said variable signal.

Also according to the present invention, there are provided:

- a main camera body including first operation means which is externally operable, variable means which is externally operable and releases a variable signal by said operation, communication means for communicating with an accessory, and identification means for identifying the content of communication from said accessory;
- an accessory including second operation means which is externally operable, and communication means for communicating with said main camera body; and
- information setting means for effecting information setting on said main camera body by said variable signal when said first operation means is operated, and transmitting said variable signal from said main camera body to said accessory when said identification means identifies that said second operation means is being operated, thereby effecting information setting of said accessory by said variable signal.

According to the present invention, the variable means of the main camera body can also be used for effecting the information setting on the accessory, thereby improving the operability of said accessory, without increase in the cost or in the space.

DESCRIPTION OF THE PREFERRED EMBODIMENTS

Figure 1:
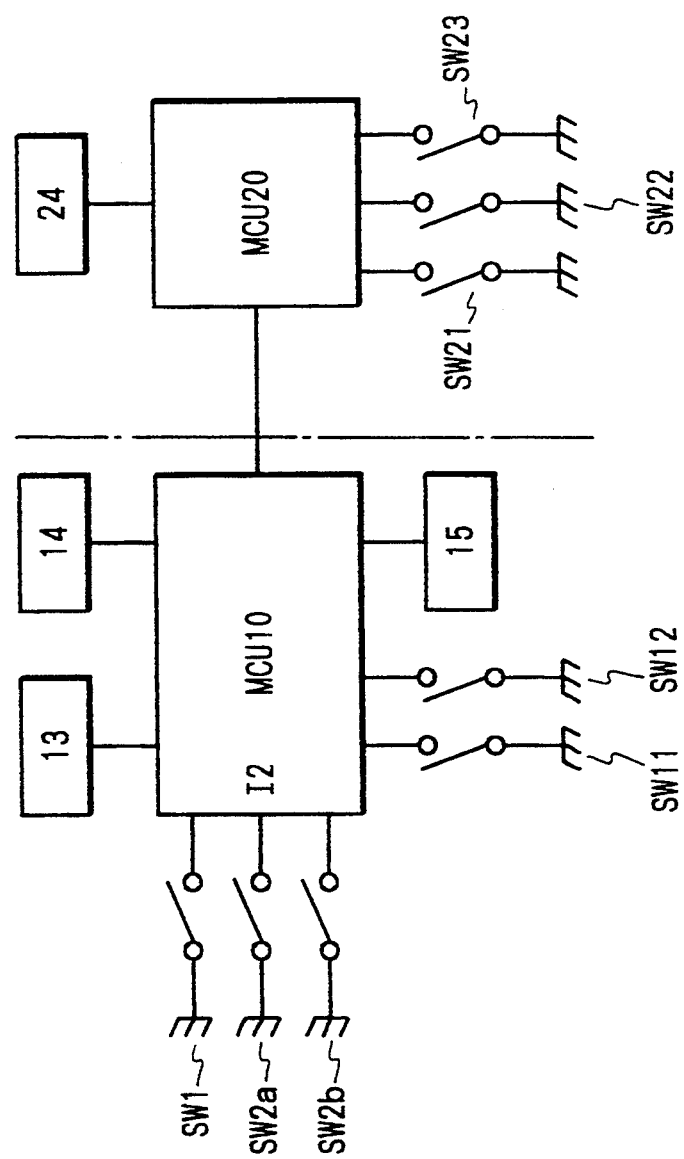
FIG. 1 is a block diagram of an embodiment of the present invention.
Figure 2A:
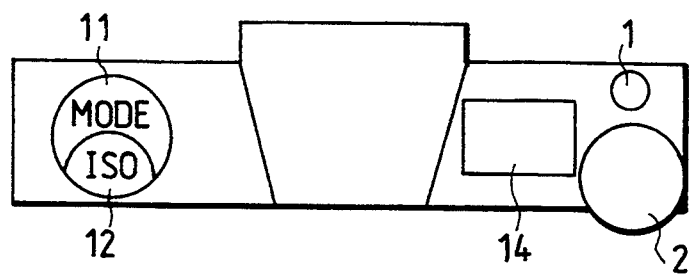
FIG. 2A is an external view of a camera constituting said embodiment, seen from above.
Figure 2B:
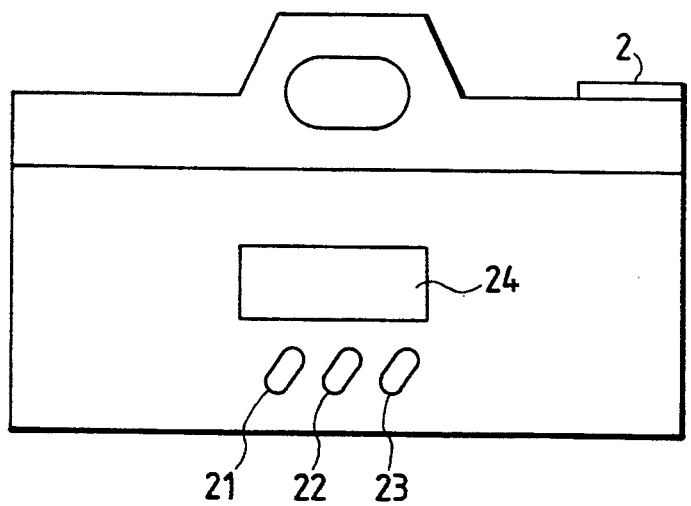
FIG. 2B is an external view of said camera seen from the back.

FIG. 1 is a block diagram of an embodiment of the present invention, FIG. 2A is an external view of a camera constituting said embodiment, seen from above, and FIG. 2B is an external view of said camera, seen from the back. On a main camera body, a data back unit is detachably mounted. In FIGS. 1, 2A and 2B, operation members of the data back unit, constituting an accessory, are represented by numbers larger than 20.

Explanation of the Configuration

Numeral 10 indicates a microcomputer (hereinafter referred as MCU) for controlling the whole camera. Character SW1 indicates a release switch which is turned on by pushing a release button 1 shown in FIG. 2A. Characters SW2a and SW2b indicate switches for indicating directions, which are connected to an interruption input terminal I2 of the MCU 10, and either one of the switches SW2a and SW2b is turned on prior to the other in accordance with a rotation of a dial 2 shown in FIG. 2A. Character SW11 indicate a mode setting switch which is turned on by operating a mode button 11 on the camera body, and SW12 indicates a film sensitivity setting switch which is turned on by operating a film sensitivity button 12 thereon. Numeral 13 indicates photometering means, and 14 indicates indicating means which can be seen from an upper surface as shown in FIG. 2A. Numeral 15 indicates an interface circuit through which the MCU 10 can control a stop, a shutter and a motor.

Numeral 20 indicates a microcomputer (MCU) for a data back. Characters SW21, SW22 and SW23 designates switches respectively turned on by operating a function button 21, a select button 22 and an adjust button 23 provided on the data back. Numeral 24 indicates an indicating means of the data back, which can be seen from a back side as shown in FIG. 2B.

The MCU 10 and 20 respectively have known serial communication means, which are connected to each other and data communication therebetween is started by a signal from the MCU 10.

Explanation of the Operation (With respect to an interruption process of MCU)

Figure 3:
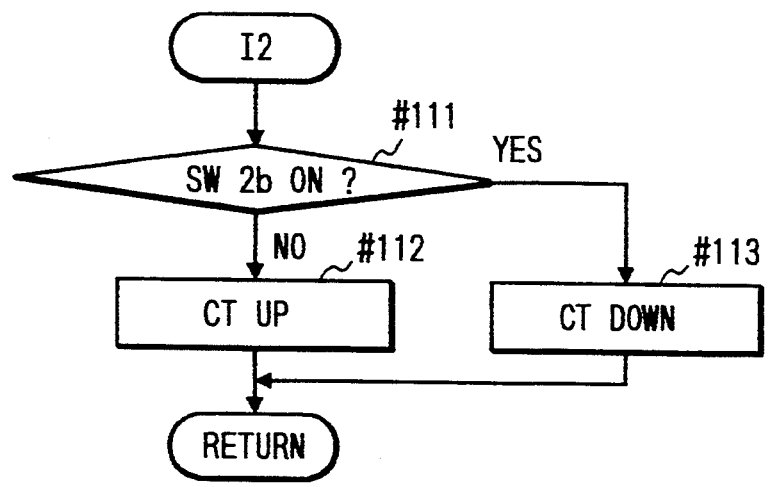
FIG. 3 is a flow chart of an interruption routine to be activated at the downshift of an interruption input port I2 of a MCU 10.

FIG. 3 shows a flow chart of an interruption process routine which is changed and processed in response to a trailing signal at the interruption input terminal I2.

Operating to rotate the dial 2 in any direction by one click (to a position where the dial is mechanically stabilized at each rotation angle), the SW2a is turned on once and an interruption is made. In this case, owing to a rotation direction, the SW2b is turned on before or after the SW2a. Accordingly, it is possible to change a set value in any fashion by judging the state.

Now referring to FIG. 3, a step #111 discriminates the on/off state of a switch SW2b, and the sequence proceeds to a step #112 or #113 respectively if said switch is off or on. When said switch is off, the step #112 increases the count, but, when said switch is on, the step #113 decreases the count. Said count determines the direction of variation of the set value to be explained later. The influence of this interruption routine is negligible, since the sequence returns, after the step #112 or #113, to the process prior to the interruption.

Setting Input for the MCU of the Main Camera Body

Figure 4:
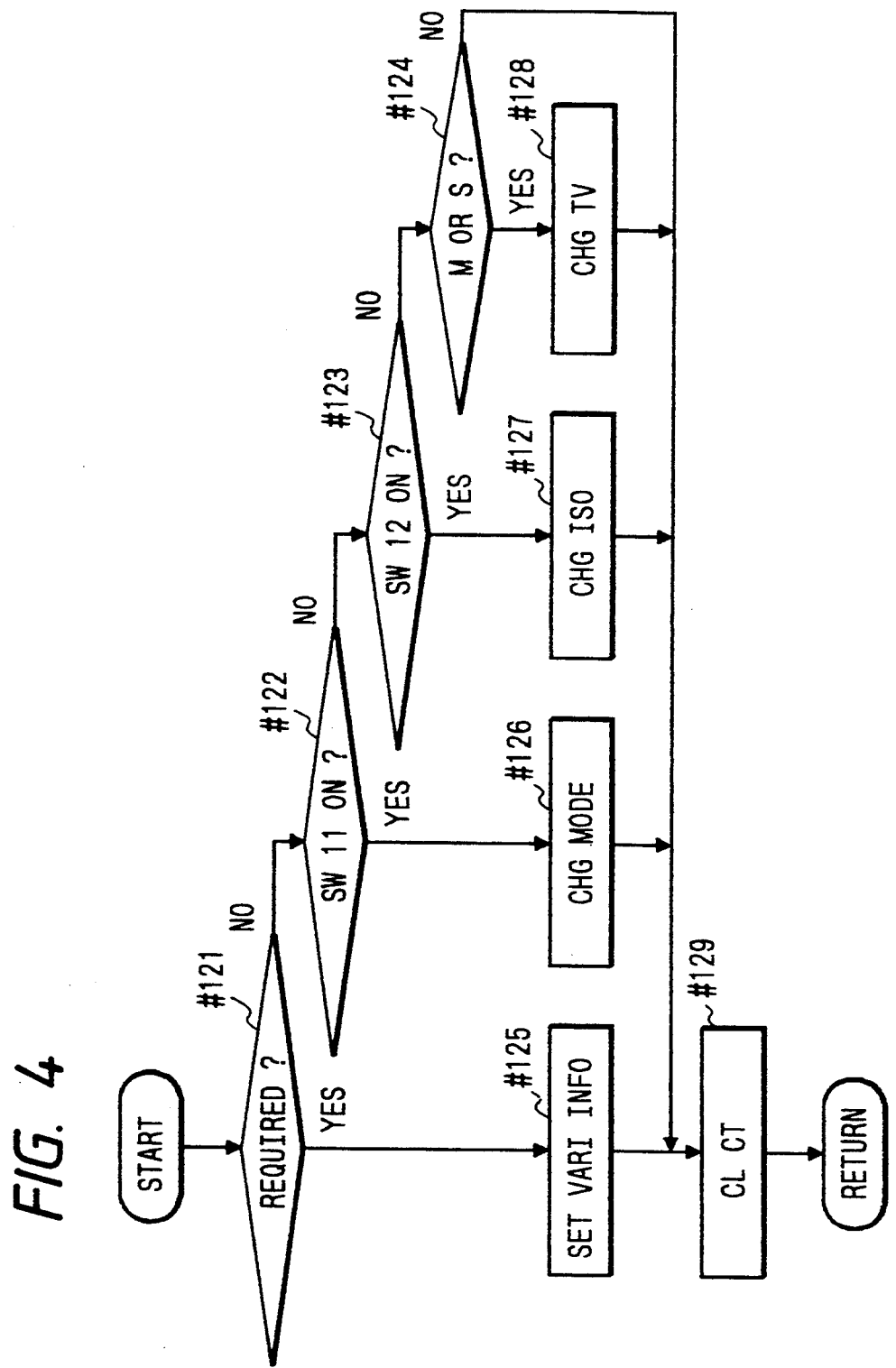
FIG. 4 is a flow chart of a subroutine for setting input for the MCU 10.

FIG. 4 is a flow chart showing a subroutine for setting input for the MCU 10, to be executed when called by the main routine.

A step #121 checks the demand signal from the data back unit, and the sequence proceeds to a step #125 or #122 respectively if said demand signal is present or not.

The step #122 discriminates whether the switch SW11 is turned on or not, and the sequence respectively proceeds to a step #126 or #123.

The step #123 discriminates whether the switch SW12 is turned on or not, and the sequence respectively proceeds to a step #127 or #124.

The step #124 discriminates whether the exposure control mode is in the manual (M) mode, the shutter priority (S) mode or otherwise, and the sequence proceeds to a step #128 in case of either of the former two modes, or to a step #129 otherwise. When a demand signal is given from the data back unit, the sequence proceeds to a step #125, which sets a count, determined by the operation of a dial 2, as "variable information" in the communication data to be transferred to the data back unit. Said data are actually transferred to the MCU 20, in the main routine of the MCU 10. The step #126 is executed when the switch SW11 is turned on by the operation of the mode button 11, and said step #126 adds the count, determined by the operation of the dial 2, to a memory corresponding to the mode. By numbering the memories as "0" for the P (program) mode, "1" for the A (aperture priority) mode, "2" for the S (shutter speed priority) mode, and "3" for the M (manual) mode, an increment of the count varies the P mode to the A mode. When the rotating direction is inverse, the added count becomes −1, so that the P mode changes to the M mode. The step #127 is executed when the switch SW12 is turned on by the operation of the film speed button 12, and said step #127 adds the count, determined by the operation of the dial 2, to a memory corresponding to the film speed. Thus, by defining the memory corresponding to the film speed with steps of ⅓ EV, increases or decreases by a step of ⅓ EV are made possible according to the direction of rotation.

The step #128 is executed when the buttons of a the main body and the data back unit are not operated in the M or S mode, and said step #128 adds the count, determined by the operation of the dial 2, to a memory corresponding to the set shutter speed (TV). Thus, be defining said memory with steps of 1 EV, increases or decreases by a step of 1 EV are made possible corresponding to the direction of rotation.

After the process of the steps #125 to #128, a step #129 clears the count, because the operation of the dial 2 has already been reflected in the variation of the set values. Also, even when the step #124 does not identify the M mode nor the S mode, the step #129 is executed in order to invalidate an eventual mode change.

The present subroutine is called and executed at a predetermined interval, but the count remains as "0" unless the dial 2 is operated, so that the set values are not varied by the steps #125 to #128.

Setting Input for the MCU in the Data Back Unit

Figure 5:
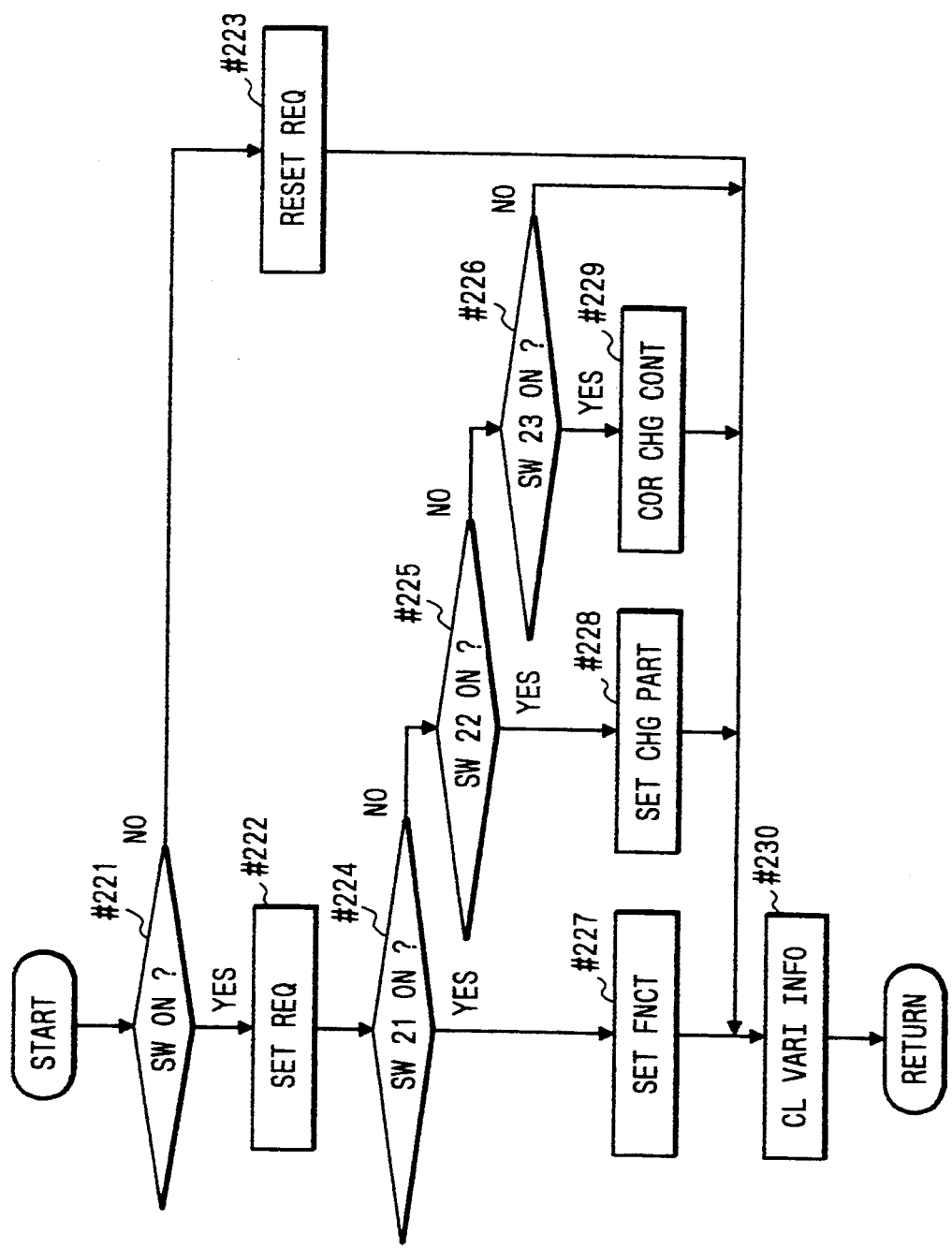
FIG. 5 is a flow chart of a setting routine for a MCU 20 in a data back unit.

FIG. 5 is a flow chart showing a setting routine for the MCU 20 of the data back unit.

A step #221 discriminates whether any of the switches SW21 to SW23 has been operated, and, if operated or not, the sequence respectively proceeds to a step #222 or #223.

The step #222 sets a demand signal, requesting variable information, in order to render effective the change of set values at the data back unit. Said demand signal is not transferred to the main body at this point, but is transferred when the main body initiates a communication and the data back unit responds thereto. On the other hand, when none of the switches is operated, the step #223 resets the demand signal and the sequence proceeds to a step #230.

After the execution of the step #222, a step #224 discriminates the on/off state of the switch SW21, and the sequence proceeds to a step #227 if said switch is on, but, if it is off, the sequence proceeds to a step #225 for discriminating the on/off state of the switch SW22. If said switch is on, the sequence proceeds to a step #228, but, if off, the sequence proceeds to a step #226 for discriminating the on/off state of the switch SW23. If it is on, the sequence proceeds to a step #229, but, if off, the sequence proceeds to a step #230.

When the switch SW21 is turned on by the operation of the function button 21, the step #227 sets the function mode. As in the main body, function modes of the data back unit are assigned to the numbers of the corresponding memories; "0" for the recording mode, "1" for the year/month/date correction mode, "2" for the date/hour/minute correction mode, and "3" for the stepwise exposure setting mode, and the variable information, transmitted from the main camera body based on the operation of the dial 2, is added, whereby the function mode of the data back unit is varied, in a similar manner as the function mode of the main body, according to the rotating direction of the dial 2.

When the switch SW22 is turned on by the operation of the selection button 22, a step #228 varies a part to be varied of the function mode. If the numeral display unit of the display means 24 consists of 7-segment displays of 6 digits, the part to be varied can be displayed corresponding to the value of the corresponding memory. If the value of the corresponding memory is "0", the display unit does not flash, indicating that the variation is completed. If said value is "1", the right-most digit flashes intermittently, indicating that said digit can be varied. Also if said value is "2", ..., "6", a 2nd, ..., 6th digit from the right flashes, indicating that said flashing digit can be varied.

A part can be varied according to the rotating direction of the dial 2, by the addition of the variable information transmitted from the main body. When the function mode is the recording mode, the numbers to be varied indicate, for example, "0" for the recording inhibition mode, "1" for the year/month/date recording mode, "2" for the date/hour/minute recording mode. Also for the stepwise exposure setting mode, the numbers indicate, for example, "0" for the setting completed state, "1" for the number of taken frames, and "2" for the step width of the stepwise exposure.

When the switch SW23 is turned on by the operation of the adjust button 23, a step #229 can vary the value of the flashing digit of the function mode. The variable information transmitted from the main body is directly added to the displayed number, whereby the displayed number is changed corresponding to the rotating direction of the dial 2. A subtraction from "0" changes the value to "9", and an addition to "9" changes the value to "0".

In case the function mode is the recording mode, the variation by the adjusting button is not executed because no numeral variation is involved. Also in other function modes, the variation by the adjusting button is not executed if the number corresponding to the selection button is "0", since it indicates that the variation is already completed.

After the execution of the steps #227 to #229, a step #230 clears the variable information transmitted from the main body, in order to avoid repeated addition of said information when this routine is executed again, since said information is already used for varying the set value reflecting the operation of the dial 2. Said information clearing is executed even after the resetting of the demand signal in the step #223, in order not to enable erroneous variable information resulting from a delayed button operation.

This subroutine is called and executed at a predetermined interval, but the count remains as "0" unless the dial 2 is operated, so that the set values are not varied by the steps #227 to #229.

Figure 6:
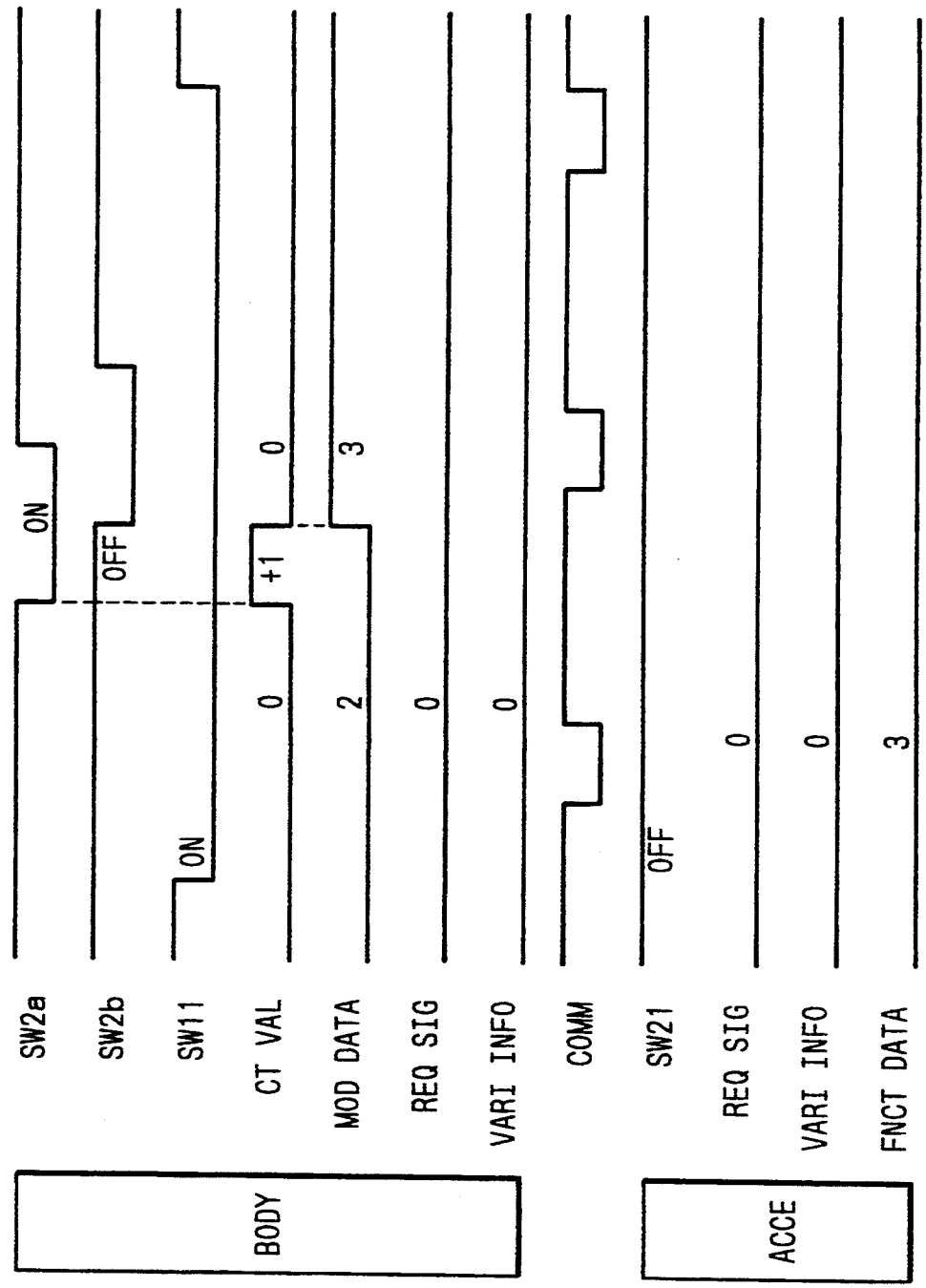
FIG. 6 is a timing chart showing signals when a dial 2 is operated by a click while a mode button 11 of the main body is depressed.

FIG. 6 is a timing chart showing various signals when the dial 2 is operated by a click, while the mode button 11 of the main body is depressed.

It is assumed that none of the buttons of the data back unit is operated. Also FIG. 6 only shows the switch SW21 in the off state, but it is assumed that the switches SW22 and SW23 are also off. Thus, in the flow chart shown in FIG. 5, the sequence proceeds from the step #221 to #223 to reset the demand signal, and then the step #230 is executed to clear the variable information. Thus, if the function mode is in the stepwise exposure setting mode, the corresponding data remains at "3".

When the switch SW11 is turned on by the operation of the mode button 11 of the main body, the count remains as "0" until the dial 2 is operated. Also the demand signal transmitted from the data back unit remains as "0". Consequently, in the flow chart shown in FIG. 4, the sequence proceeds from the step #121 to #122 and then to #126, but the mode is not changed because the count remains as "0". In case of the S mode, the count remains at "2", whereby the sequence proceeds to the step #129 for clearing the count.

When the dial 2 is operated, either of the switches SW2a and SW2b, which are mutually different in phase, is turned on first, depending on the rotating direction. If the switch SW2b is off when the switch SW2a is turned on, the sequence shown in FIG. 3 proceeds from the step #111 to #112 for increasing the count. This routine, being conducted by interruption, is simultaneously executed when the switch SW2a is turned on. Thus, when the routine shown in FIG. 4 is executed at the next cycle, the step #126 adds the count to the memory corresponding to the mode, whereby the memory count varies from "2" to "3" and the mode varies to the M mode. Thereafter the step #129 clears the count.

Figure 7:
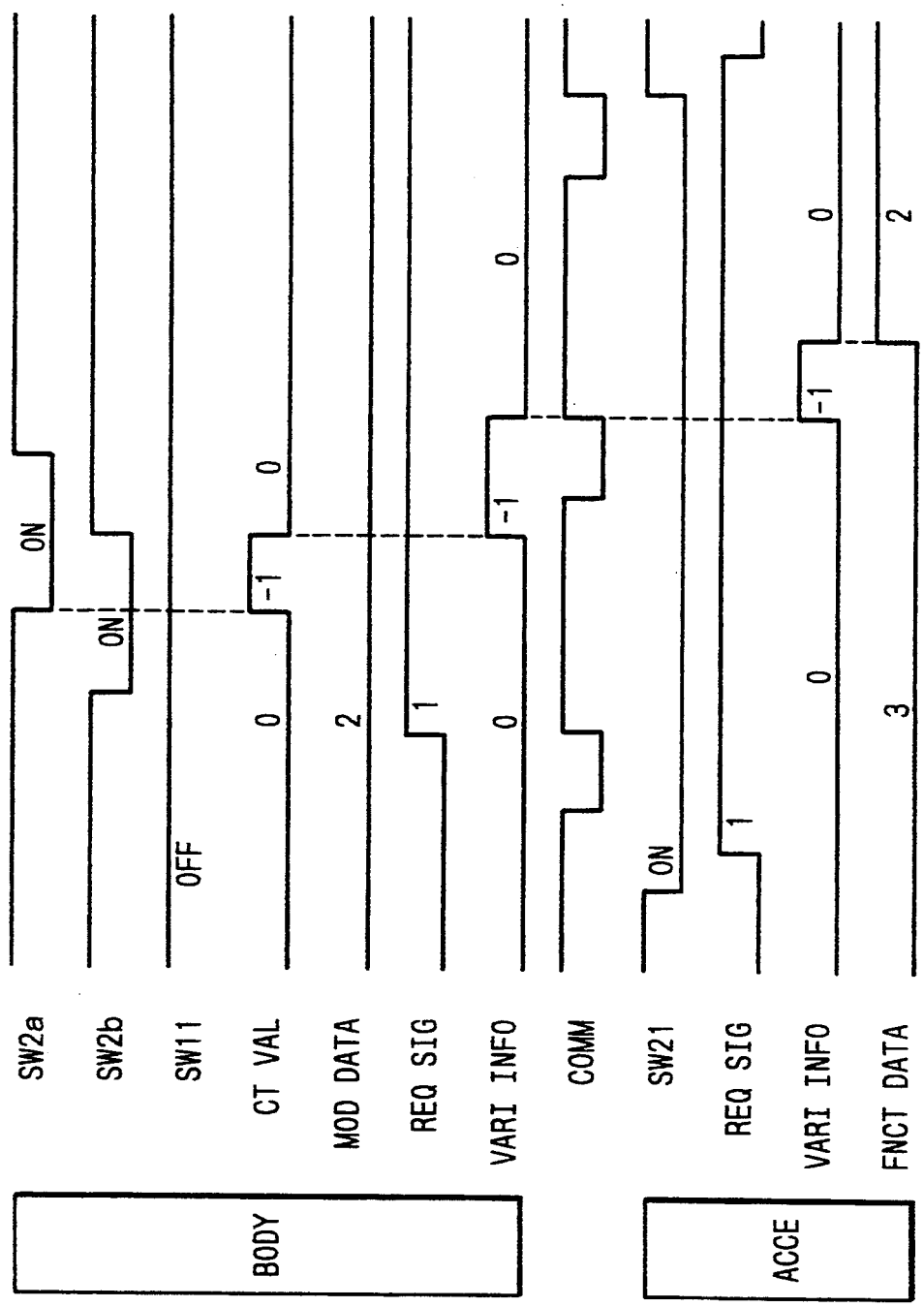
FIG. 7 is a timing chart showing signals when the dial 2 is operated by a click in a direction opposite to that shown in FIG. 6, while a function button 21 of the data back unit is depressed.

FIG. 7 is a timing chart showing various signals when the dial 2 of the main body is operated by a click, in a direction opposite to that in FIG. 6, while the function button 21 of the data back unit is depressed.

FIG. 7 shows that the switch SW11 is on the off state, but it is also assumed that the switch SW12 is in the off state. As there is initially no demand signal from the data back unit, the sequence in the flow chart shown in FIG. 4 proceeds in the order of the steps #121, #122, #123, #124, and then #128 if the S mode is currently adopted (mode data being "2"), but the TV value is not varied as long as the count remains as "0". The sequence is terminated at the step #129.

When the dial 2 is operated in a direction opposite to that in FIG. 6, the switch SW2b is turned on before the switch SW2a is turned on, so that the sequence in FIG. 3 proceeds from the step #111 to #113 for decreasing the count.

On the other hand, if the function button 21 of the data back unit is depressed, the switch SW21 is turned on, whereby the MCU 20 executes the subroutine shown in FIG. 5 with a certain delay. The sequence proceeds from the step #221 to #222 for setting the demand signal, but said signal is confirmed by the main body only after the communication.

Since the switch SW21 is turned on, the sequence proceeds from the step #222 to #224 and then to #227, but the function data remains at "3", as the variable information from the main body remains as "0".

When the MCU 10 executes the routine shown in FIG. 4 after the communication with the data back unit, there exits a demand signal from the data back unit this time, so that the sequence proceeds from the step #121 to #125 for setting the count as the variable information to be transferred to the data back unit. Said count is transferred, if positive, without change, but, if negative, as a complementary number. For example "−1" is transferred, in hexadecimal representation, as "$FF". After the communication with the data back unit, the step #129 in the main body clears the variable information.

In response to the variable information transferred from the main body, the step #227 in the sequence of the data back unit, shown in FIG. 5, adds the variable data "−1" to the function data "3" to obtain data "2", whereby the stepwise exposure setting mode is changed to the date/hour/minute correction mode. Then the step #230 clears the variable information and the subroutine is terminated.

In the foregoing there has been explained a case in which the function button 21 is operated. In case the button 22 or 23 is operated, the step #228 or #229 enables to vary a portion or a number of the function mode currently adopted by the data back unit, according to the operation of the dial 2 in the main camera body.

The contents of settings to be executed in the data back unit are not limited to the functions required in the data back unit but may include those required in the main camera body and those of low frequency of use, and the operation means of the main body can be simplified if such functions are included in the contents of setting. This is because all the functions are not necessarily required by all the users, and the excessive complication of the functions of the main body can be avoided by rendering selectable, for example, the stepwise exposure mode only when the corresponding accessory is mounted.

Display Process of MCU of the Main Camera Body

Figure 8:
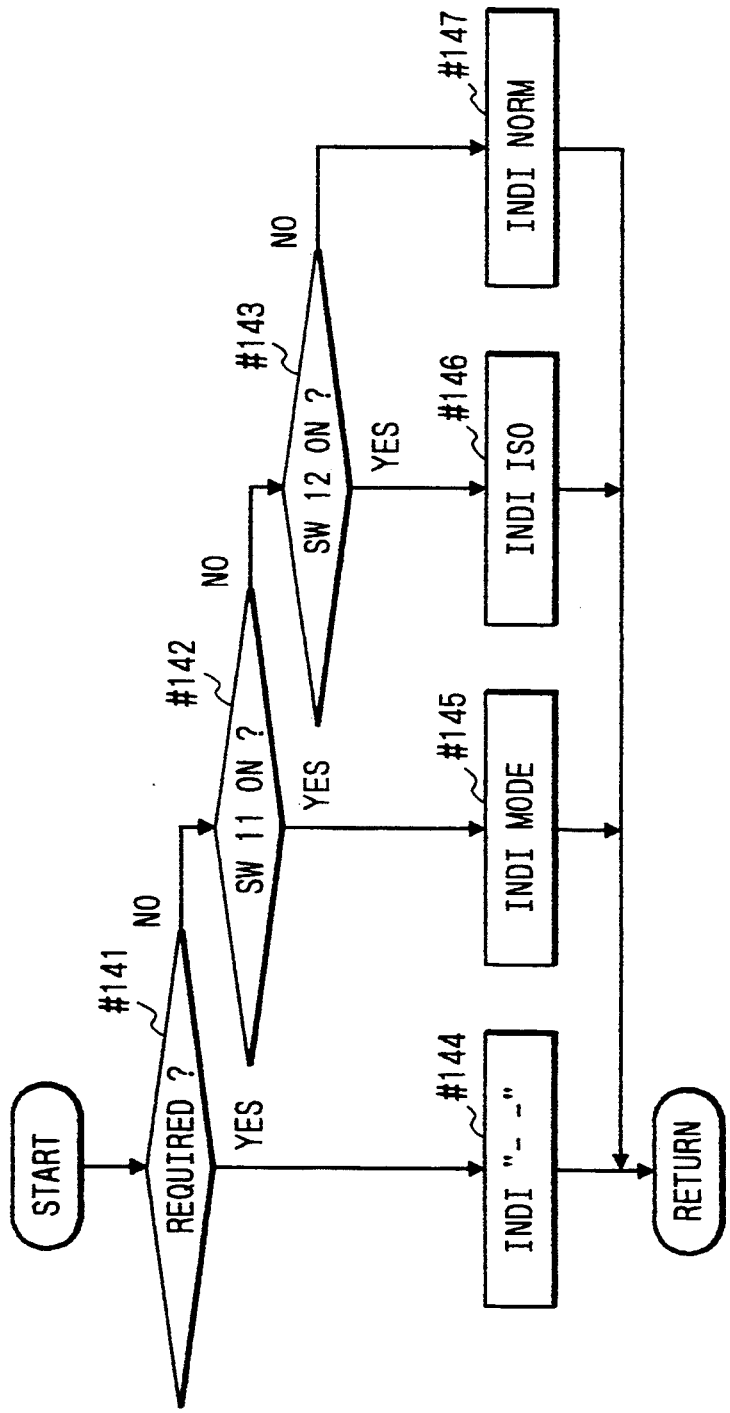
FIG. 8 is a flow chart of a display routine of the MCU 10.

FIG. 8 is a flow chart of the display routine of the MCU 10. After the setting input, A/D conversion, MF (data back) communication and APEX calculation in the main routine of the MCU 10, said subroutine is called and executed, and FIGS. 10A to 10G illustrate modes of display on the display means 14.

The flow of the display routine shown in FIG. 8 corresponds to that of the setting routine shown in FIG. 4. Steps #141 to #143 respectively correspond to the steps #121 to #123, and the steps #125 to #127 selected as a result correspond to steps #144 to #146.

Figure 10A:
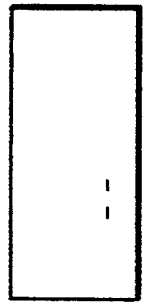
FIGS. 10A to 10G are views showing the modes of display on display means 14.

When a demand signal is sent from the data back unit, the step #144 provides a display of a setting image frame on the data back unit. More specifically, as shown in FIG. 10A, the numeral display unit displays "--" representing the setting image frame of the data back unit. When the demand signal is sent from the data back unit, the setting made in the main body is made ineffective but that made in the data back unit is made effective, so that said display is provided to cause the user to look at the display means 24 of the data back unit.

Figure 10B:
Figure 10C:
Figure 10D:
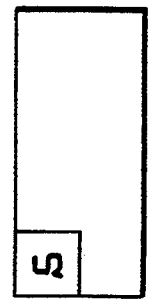
Figure 10E:
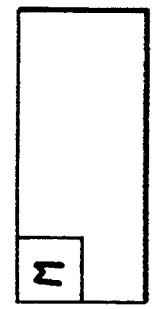
Figure 10F:
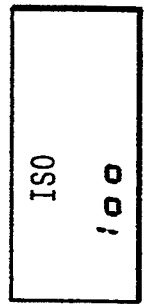

When the mode button of the main body is depressed, a step #145 effects the mode display only, indicating that the mode can be set. For a mode data "0", "P" is displayed as shown in FIG. 10B; for "1", "A" is displayed as shown in FIG. 10C; for "2", "S" is displayed as shown in FIG. 10D; and for "3", "M" is displayed as shown in FIG. 10E.

When the film speed button of the main body is depressed, a step #146 displays the film speed, by turning on the "ISO" mark representing the film speed display, and displaying the speed of the currently loaded film in the numeral display unit.

Figure 10G:
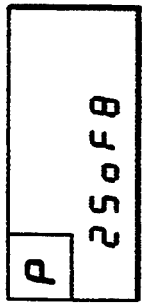

If there is no demand signal from the data back unit and if the switches SW11, SW12 are off, a step #147 effects an ordinary display as shown in FIG. 10G, including the selected mode and the shutter speed and the aperture value in said selected mode.

Display Process of MCU of the Data Back Unit

Figure 9:
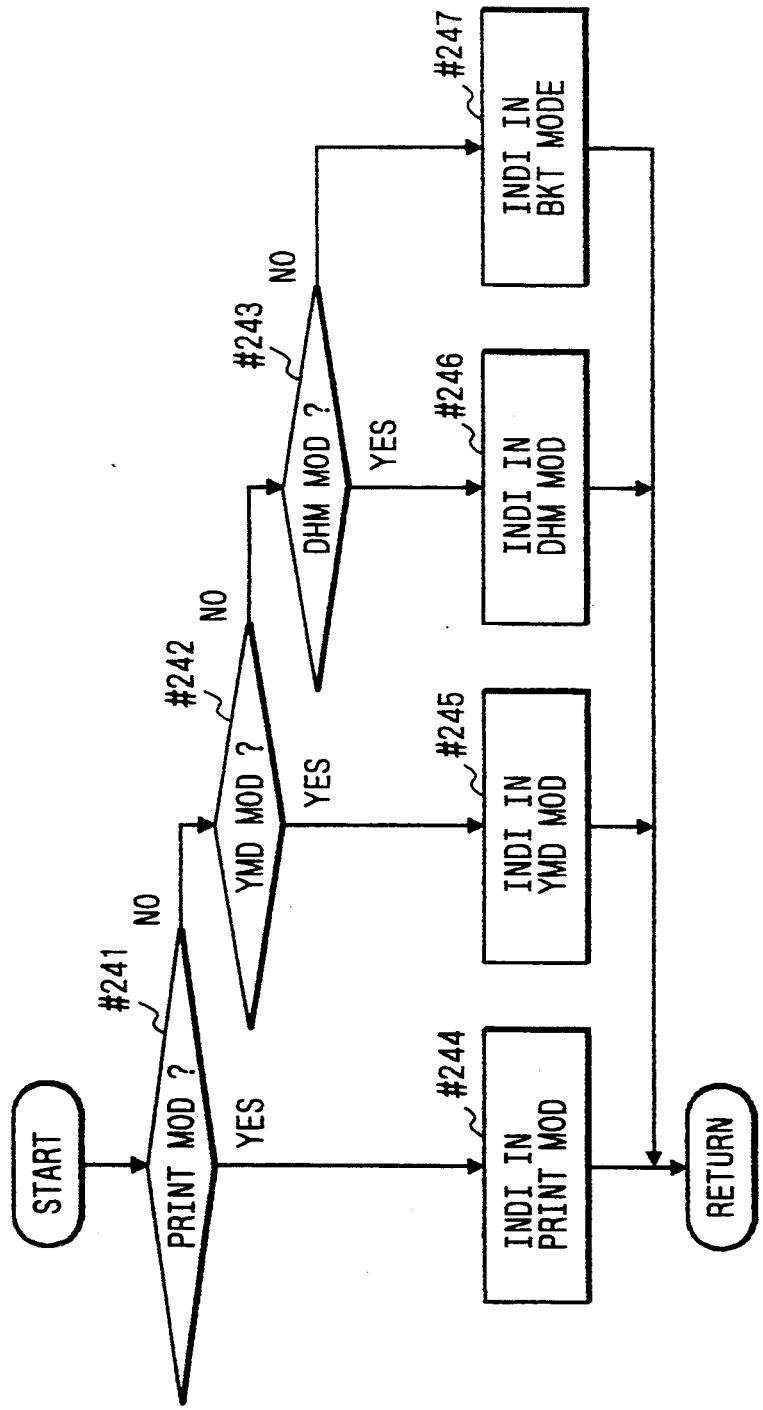
FIG. 9 is a flow chart of a display routine of the MCU 20.

FIG. 9 is a flow chart of a display routine of the MCU 20 of the data back unit. This routine is called and executed after the setting routine, shown in FIG. 5, in the main routine of the MCU 20, and FIGS. 11A to 11F show the modes of display of the display means 24.

Four function modes of the data back unit are printed outside the liquid crystal display unit: "PRINT" for the printing mode; "YMD" for the year/month/date correction mode; "DHM" for the date/hour/minute correction mode; and "BKT" for the stepwise exposure setting mode, and a mark is displayed in said liquid crystal display unit, corresponding to the selected mode.

Figure 11C:
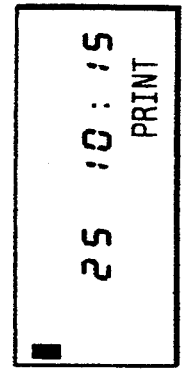
FIGS. 11A to 11F are views showing the modes of display on display means 24.
Figure 11B:
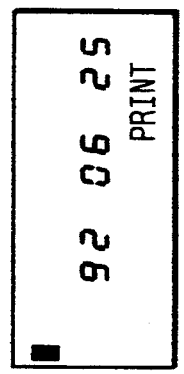
Figure 11A:
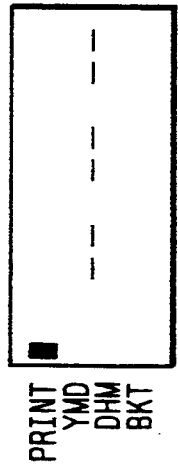

For effecting displays corresponding to the function mode as shown in FIGS. 11A to 11F, steps #241 to #243 in the data back unit discriminate the function mode. If the printing mode is identified, the sequence proceeds from the step #241 to #244 to display the printing inhibition mode as shown in FIG. 11A, the year/month/date recording mode as shown in FIG. 11B, or the date/hour/minute recording mode as shown in FIG. 11C, according to the mode selected by the selection button.

Figure 11D:
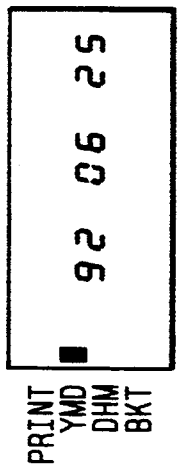

If the function mode is the year/month/date correction (YMD) mode, the sequence proceeds from the step #241 to #242 and then to #245 to display the year/month/date correction image frame as shown in FIG. 11D. A digit selected by the selection button flashes, and can be varied by the adjusting button.

Figure 11E:
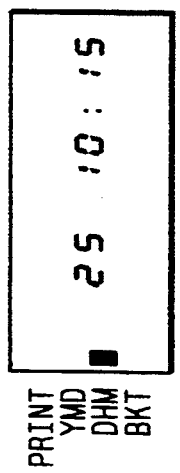
Figure 11F:
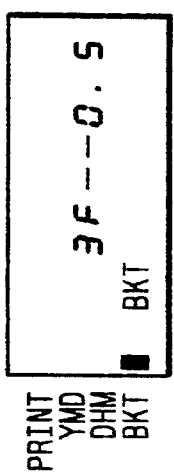

If the function mode is the date/hour/minute correction (DHM) mode, the sequence proceeds from the step #241 to #242, #243 and #246 to display the date/hour/minute correction image frame as shown in FIG. 11E. A digit selected by the selection button flashes, and can be varied by the adjusting button. If the function mode is the stepwise exposure setting (BKT) mode, the sequence proceeds from the steps #241 to #242, #243 and #247 to display the stepwise exposure setting image frame as shown in FIG. 11F. A digit selected by the selection button flashes, and can be varied by the adjusting button.

Since the adjusting button in the conventional data back unit is independent from the main body, there can be made correction in only one direction, if there is provided only one button in the data back unit. The correction in two directions can be attained by providing the data back unit with two buttons or, instead, a rotary dial similar the dial 2, but such configuration inevitably results in an increase in the cost and in the space.

In contrast, the present embodiment allows use of the dial 2 of the main camera body as the operation member of the data back unit, thereby improving the operability without increase in the cost or in the space.

The present embodiment is so constructed that the information setting of the main camera body is attained by the operation of the dial 2 while depressing the mode button 11, and that the information setting of the data back unit is attained by the operation of the dial 2 while depressing the function button 21, but it is also possible to effect the information setting of the main camera body (for example a variation in the shutter speed) by the operation of the dial 2 without any operation of other buttons and the information setting of the data back unit only when the dial 2 is operated with the depression of the function button 21.

As explained in the foregoing, the present invention enables to use the variable means of the main camera body also for the information setting of the accessory, thereby improving the operability of said accessory without increase in the cost or in the space.

What is claimed is:

1. A camera system provided with a main camera body and an accessory detachably mountable on said main camera body, wherein:
   said main camera body includes:
     output means for releasing a variable signal in response to an external operation;
     main body communication means capable of communicating with said accessory; and
     identification means for identifying an operation signal transmitted from said accessory through said main body communication means; and
   said accessory includes:
     operation means for releasing an operation signal in response to an external operation; and
     accessory communication means capable of communicating with said main camera body;
   wherein, when said identification means identifies said operation signal released from said operation means, transmission of said variable signal from said main camera body to said accessory is permitted and information setting in said accessory is executed according to said variable signal, but:
     when said identification means does not identify any operation signal, information setting in said main camera body is executed according to said variable signal.

2. A camera system according to claim 1, wherein said output means is composed of a rotary dial, of which clockwise rotation increases the output signal value but anticlockwise rotation decreases the output signal value.

3. A camera system according to claim 1, wherein the information set in said main camera body relates to phototaking conditions.

4. A camera system according to claim 1, wherein the information set in said main camera body relates to the film speed.

5. A camera system according to claim 1, wherein the information set in said main camera body relates to the shutter speed.

6. A camera system according to claim 1, wherein the information set in said accessory relates to date.

7. A camera system according to claim 1, wherein the information set in said accessory relates to time.

8. A camera system according to claim 1, wherein the information set in said accessory relates to stepwise exposure.

9. A camera system provided with a main camera body and an accessory detachably mountable on said main camera body, wherein:
   said main camera body includes:
     first operation means for releasing a first operation signal in response to an external operation;
     output means for releasing a variable signal in response to an external operation;
     main body communication means capable of communicating with said accessory; and
     identification means for identifying said first operation signal and for identifying a second operation signal transmitted from said accessory through said main body communication means; and
   said accessory includes:
     second operation means for releasing a second operation signal in response to an external operation; and
     accessory communication means capable of communicating with said main camera body;
   wherein, when said identification means identifies said first operation signal released from said first operation means, information setting in said main camera body is executed according to said variable signal; but:
     when said identification means identifies said second operation signal released from said second operation means, transmission of said variable signal from said main camera body to said accessory is permitted and information setting in said accessory is executed according to said variable signal.

10. A camera system according to claim 9, wherein said output means is composed of a rotary dial, of which clockwise rotation increases the output signal value and anticlockwise rotation decreases the output signal value.

11. A camera system according to claim 9, wherein the information set in the main camera body relates to phototaking conditions.

12. A camera system according to claim 9, wherein the information set in the main camera body relates to the film speed.

13. A camera system according to claim 9, wherein the information set in the main camera body relates to the shutter speed.

14. A camera system according to claim 9, wherein the information set in said accessory relates to date.

15. A camera system according to claim 9, wherein the information set in said accessory relates to time.

16. A camera system according to claim 9, wherein the information set in said accessory relates to stepwise exposures.

17. A camera system provided with a main camera body and an accessory detachably mountable on said main camera body, wherein:
   said camera body includes:
     a first operation member capable of setting or varying information in said main camera body in response to an external operation;
     display means for displaying the set information; and
   said accessory includes:
     a second operation member capable of setting information in said accessory;
     wherein said display means is adapted to effect a first display when said second operation member is not operated, and a second display when said second operation member is operated.

18. A camera system according to claim 17, wherein the information set in said main camera body relates to phototaking conditions.

19. A camera system according to claim 17, wherein the information set in said main camera body relates to the film speed.

20. A camera system according to claim 17, wherein the information set in said main camera body relates to the shutter speed.

21. A camera system according to claim 17, wherein the information set in said accessory relates to date.

22. A camera system according to claim 17, wherein the information set in said accessory relates to time.

23. A camera system according to claim 17, wherein the information set in said accessory relates to stepwise exposures.

24. An information setting system of a camera provided with a main camera body and an accessory detachably mountable on said main camera body, wherein:
said main camera body includes:
a first operation member;
signal generating means for generating a variable signal in response to the operation of said first operation member; and
first communication means capable of communicating with said accessory; and
said accessory includes:
second communication means capable of being connected with said first communication means and communicating with said main camera body;
a second operation member; and
set value varying means capable of varying a set value in said accessory, in response to said variable signal when said second operation member is operated.

25. An information setting system of a camera provided with a main camera body and an accessory detachably mountable on said main camera body, wherein:
said main camera body includes:
a first operation member;
signal generating means for generating a variable signal in response to the operation of said first operation member;
indicating means; and
first communication means capable of communicating with said accessory; and
said accessory includes:
second communication means capable of being connected with said first communication means and communicating with said main camera body;
a second operation member; set value varying means capable of varying a set value in said accessory, in response to said variable signal when said second operation member is operated;
said indicating means changing an indication thereof when said second operation member is operated.

26. A camera system provided with a main camera body and an accessory detachably mountable on said main camera body, wherein:
said main camera body includes:
output means for releasing a variable signal in response to an external operation;
main body communication means capable of communicating with said accessory; and
identification means for identifying an operation signal transmitted from said accessory through said main body communication means; and
said accessory includes:
operation means for releasing an operation signal in response to an external operation; and
accessory communication means capable of communicating with said main camera body;
wherein, when said identification means identifies said operation signal released from said operation means, transmission of said variable signal from said main camera body to said accessory is permitted and information setting in said main camera body according to said variable signal is prohibited, but:
when said identification means does not identify any operation signal, information setting in said main camera body is executed according to said variable signal.

27. A camera system provided with a main camera body and an accessory detachably mountable on said main camera body, wherein:
said main camera body includes:
first operation means for releasing a first operation signal in response to an external operation;
output means for releasing a variable signal in response to an external operation;
main body communication means capable of communicating with said accessory; and
identification means for identifying an operation signal transmitted from said accessory through said main body communication means; and
said accessory includes:
second operation means for releasing a second operation signal in response to an external operation; and
accessory communication means capable of communicating with said main camera body;
wherein, when said identification means identifies said first operation signal released from said first operation means, information setting in said main body is executed according to said variable signal; but:
when said identification means identifies said second operation signal released from said second operation means, transmission of said variable signal from said main camera body to said accessory is permitted and information setting in said main camera body according to said variable signal is prohibited.

28. A camera system provided with a main camera body and an accessory detachably mountable on said main camera body, wherein:
said main camera body includes:
output means for releasing a variable signal in response to an external operation;
main body communication means capable of communicating with said accessory; and
identification means for identifying an operation signal transmitted from said accessory through said main body communication means; and
said accessory includes:
operation means for releasing an operation signal in response to an external operation; and
accessory communication means capable of communicating with said main camera body;
wherein, when said identification means identifies said operation signal released from said operation means, information setting in said accessory is executed according to said variable signal, but:
when said identification means does not identify any operation signal, information setting in said main camera body is executed according to said variable signal.

29. A camera system provided with a main camera body and an accessory detachably mountable on said main camera body; wherein:
  said main camera body includes:
    first operation means for releasing a first operation signal in response to an external operation;
    output means for releasing a variable signal in response to an external operation;
    main body communication means capable of communicating with said accessory; and
    identification means for identifying an operation signal transmitted from said accessory through said main body communication means; and
  said accessory includes:
    second operation means for releasing a second operation signal in response to an external operation; and
    accessory communication means capable of communicating with said main camera body;
  wherein, when said identification means identifies said first operation signal released from said first operation means, information setting in said main camera body is executed according to said variable signal; but:
  when said identification means identifies said second operation signal released from said second operation means, information setting in said accessory is executed according to said variable signal.

* * * * *